Oct. 6, 1925.

G. W. BINGHAM 1,555,824

MOTION PICTURE DEVICE

Filed May 7, 1921

George W. Bingham
INVENTOR.

BY

ATTORNEY.

Oct. 6, 1925.

G. W. BINGHAM 1,555,824

MOTION PICTURE DEVICE

Filed May 7, 1921

George W. Bingham
INVENTOR.

BY
Howard Freeman
his ATTORNEY.

Patented Oct. 6, 1925.

1,555,824

UNITED STATES PATENT OFFICE.

GEORGE W. BINGHAM, OF NEWARK, NEW JERSEY, ASSIGNOR TO WIDESCOPE CAMERA CO., OF NEWARK, NEW JERSEY, A CORPORATION OF NEW JERSEY.

MOTION-PICTURE DEVICE.

Application filed May 7, 1921. Serial No. 467,636.

*To all whom it may concern:*

Be it known that I, GEORGE W. BINGHAM, a citizen of the United States, residing in Newark, in the county of Essex and State of New Jersey, have invented certain new and useful Improvements in Motion-Picture Devices, of which the following is a full, clear, and exact specification.

My invention relates to motion picture devices and refers particularly to extended field cameras and projectors.

One object of my invention is a device capable of photographing and projecting motion pictures of an extended area of vision.

Another object of my invention is a device whereby an extended field of vision may be photographed upon a film and projected by a series of lenses.

Another object of my invention is a device whereby a series of moving objects may be photographed simultaneously upon a film and projected to produce an extended field view.

These and other objects of my invention will be evident upon a consideration of my drawings, specification and claims.

In the ordinary motion picture camera and projector but one lens is used, the angle of vision, therefore, being limited to the angular extent of the one lens. This renders it impossible to have an extended field of vision, unless the camera is a very considerable distance from the photographical object, a position which it is frequently impossible to obtain.

The device of my invention accomplishes these, and other, desirable results in an effective and positive manner.

In a broad way, my device contains a plurality of lenses so arranged that their optical centers are in vertical alignment with each other and at such angles with respect to each other that a plurality of abutting views may be simultaneously photographed in stepped relationship with respect to each other upon a single film and projected as a wide scope picture.

My invention includes new and operative means for accomplishing the above and other desirable and valuable objects, my device, therefore, presenting a means whereby an extended view may be photographed in a series of pictures upon a single film, the pictures thus impressed being in stepped relationship with respect to each other and may be projected upon a screen to produce a continuous extended picture of the combined pictures thus obtained.

In the particular form of the device of my invention, shown in the accompanying drawings, similar parts are designated by similar numerals.

Figure 1:
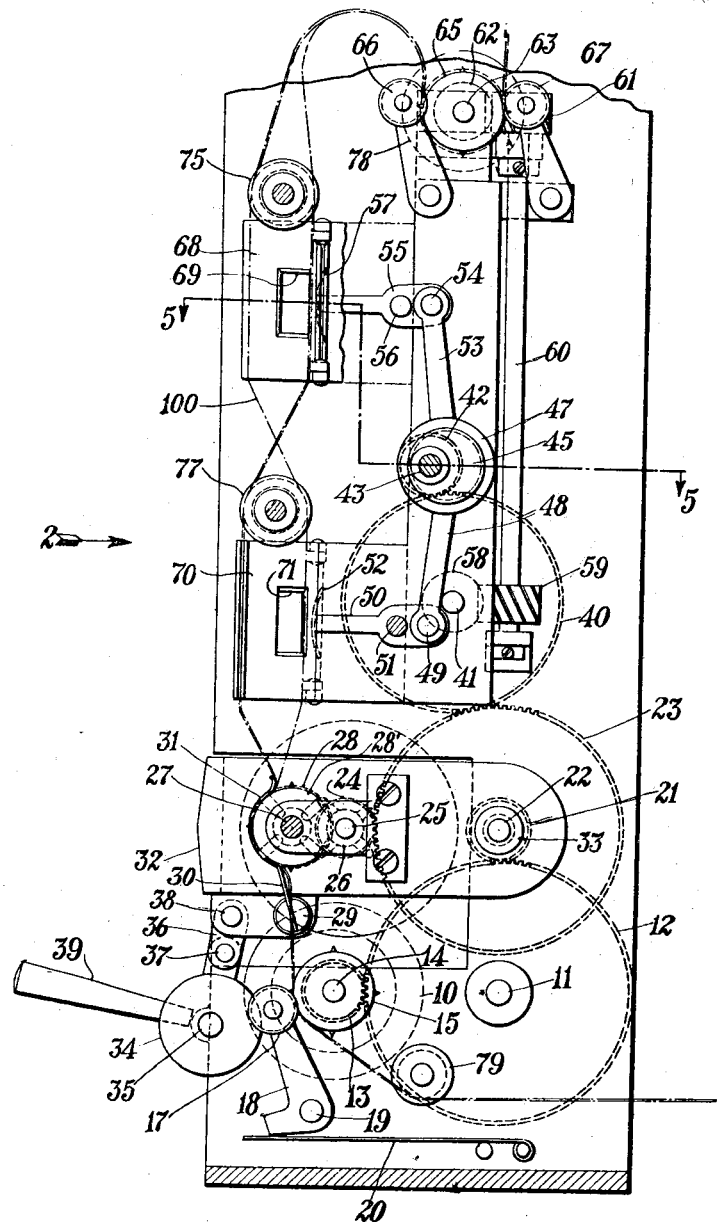
Figure 1 is a vertical cross-section of one form of the device of my invention.
Figure 2:
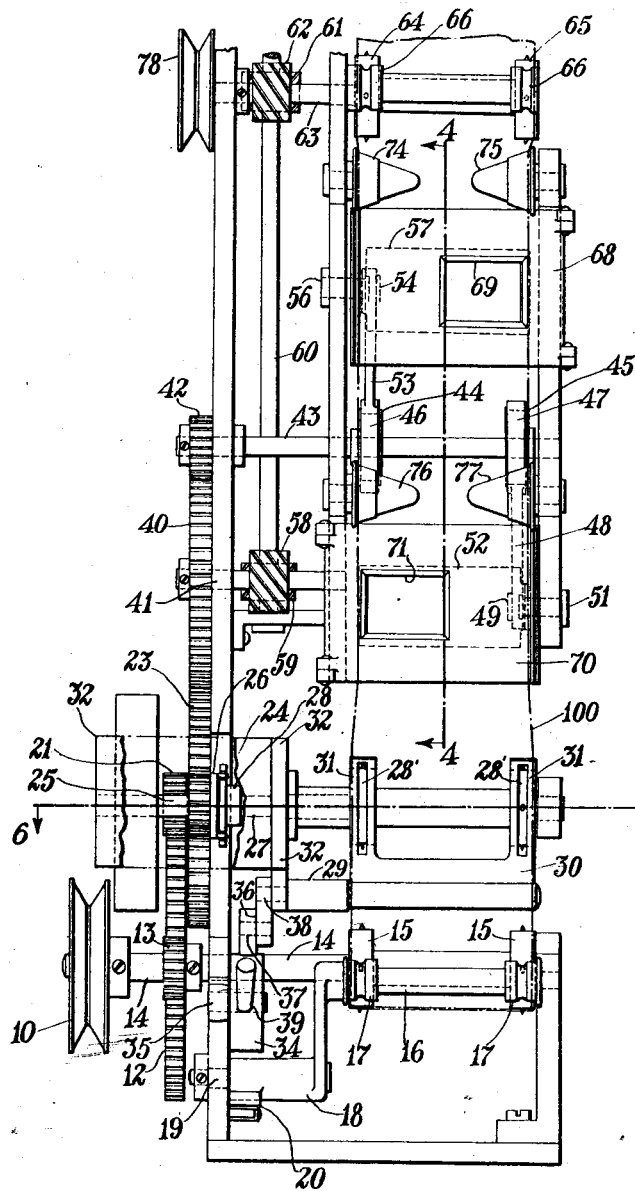
Figure 2 is a view looking in the direction of the arrow 2 of Figure 1.
Figure 3:
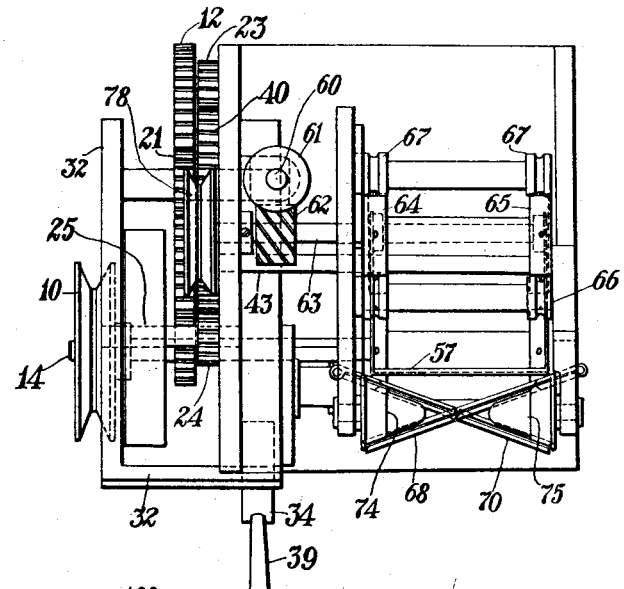
Figure 3 is a top plan view.
Figure 4:
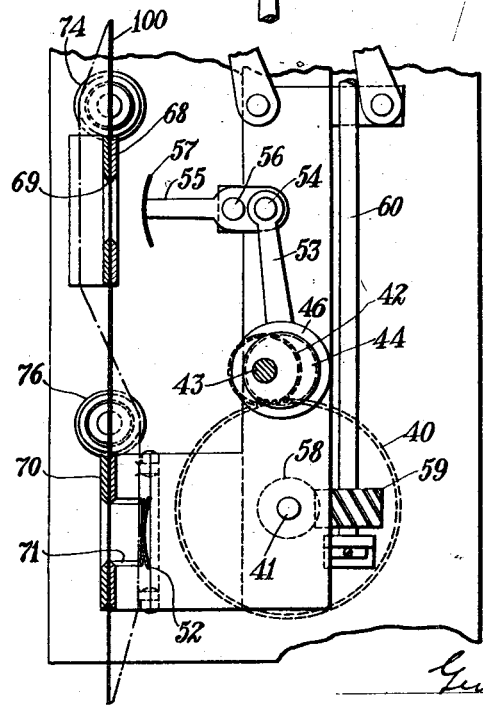
Figure 4 is a section through the line 4—4 of Figure 2.

In the particular form of the device of my invention, shown in the accompanying drawings, the pulley 10, which may be connected to a suitable source of revoluble power, is fixedly attached to the revoluble shaft 14, which also carries the fixedly attached gear wheel 13, which meshes with the gear wheel 12, fixedly attached to the revoluble shaft 11. The shaft 14 carries also the fixedly attached sprocket wheels 15, 15. An idler 16, carrying the annular members 17, 17, is revolubly carried by the angled member 18, pivoted at 19, the members 17, 17 being maintained in normal abutting position upon the sprocket wheels 15, 15 by means of the spring 20.

The gear wheel 12 meshes with the gear wheel 21, fixedly attached to the revoluble shaft 22, which carries also the fixedly attached gear wheel 23, the latter meshing with the gear wheel 24, fixedly attached to the revoluble shaft 25, which also carries a pin member 26 intermittently connecting with and revolving the shaft 27 by means of the star member 28 attached thereto. The shaft 27 carries also the fixedly attached sprocket wheels 28', 28', the shafts 25 and 27, with their attached parts, thus forming the ordinary star wheel mechanism for intermittent movement. The shaft 29 carries the guide 30, having the two extended arms 31, 31 with openings for the sprocket wheels 28', 28'. The shafts 25, 27 and 29 are carried by the frame 32, 32, 32 pivotally mounted with bushing 33 on shaft 22. A member 34, revoluble upon the pivot 35, is pivotally connected to the member 36 by the pivot 37, and the member 36 is pivotally connected to the frame 32, 32, 32 by the pivot 38. The member 34 carries the handle 39.

The revolution of the member 34 upon the pivot 35 will thus revolve the star wheel intermittent movement members upon the pivot shaft 22, thus acting as a framing device.

The gear wheel 23 meshes with the gear wheel 40 fixedly attached to the revoluble shaft 41. The wheel 40 meshes with the gear wheel 42, fixedly attached to the revoluble shaft 43. The shaft 42 carries the fixedly attached annular eccentrics 44 and 45, carrying respectively the movable members 46 and 47. The arm 48, of the member 47, is pivotally attached at 49 to the shutter arm 50, pivotally revoluble at 51 and carrying the shutter 52. The arm 53 of the member 46 is pivotally attached at 54 to the shutter arm 55, pivotally revoluble at 56 and carrying the shutter 57. The revolution of the shaft 41, therefore, will synchronously oscillate the two shutters 52 and 57.

Figure 5:
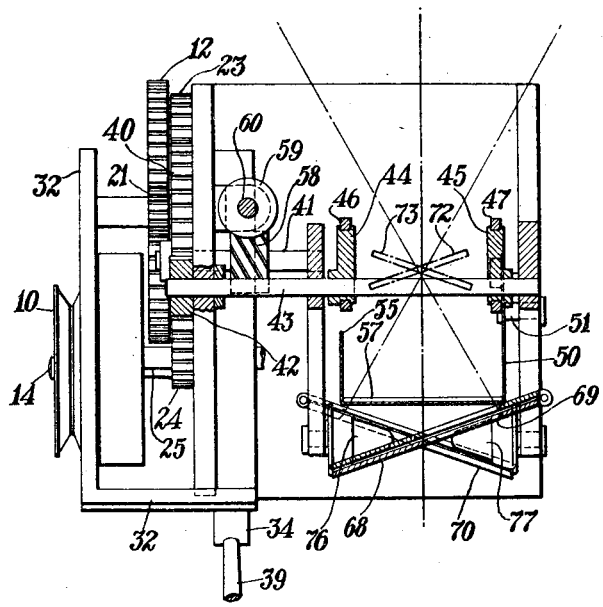
Figure 5 is a section through the line 5—5 of Figure 1.
Figure 6:
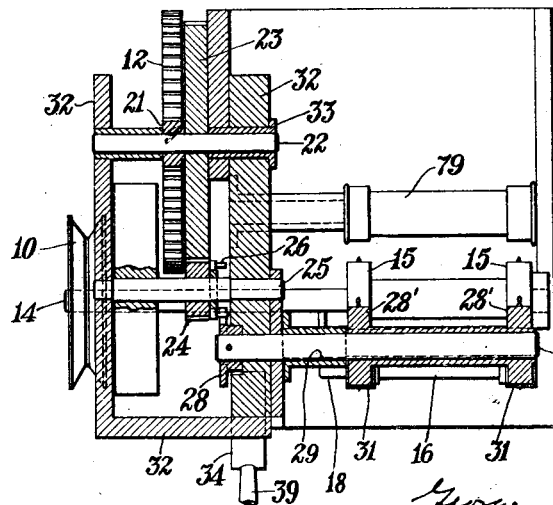
Figure 6 is a section through the line 6—6 of Figure 2.

The shaft 41 carries the gear 58, meshing with the gear 59, fixedly attached to the revoluble shaft 60. The shaft 60 carries also the fixedly attached gear 61, meshing with the gear 62, fixedly attached to the shaft 63. The shaft 63 carries the two sprocket wheels 64 and 65 against which abut the two pivotal idlers 66 and 67 respectively. A film frame 68, having the aperture 69, and a film frame 70, having the aperture 71, are so situated that their planes are parallel with the optical planes of the lenses 72 and 73 respectively, Figure 5. The lenses 72 and 73 are so situated that their optical centers are in vertical alignment with each other, the angle of divergence of the two lenses being such as to simultaneously impress two images of abutting views upon a photographic film within the two film frames, when my device is used as a camera; or to simultaneously project two such images and produce a wide scope projected picture upon a screen when my device is used as a projector.

A pair of revoluble conical idlers 74 and 75 are so situated that a film, passing over the idlers 66 and 67, may be passed over these idlers 74 and 75 to give the film a proper horizontal inclination to allow of its entrance into and between the two plates of the film frame 68. A pair of revoluble conical idlers 76 and 77 are so situated that a film, emerging from the film frame 68, may be passed over these idlers 76 and 77 to give the film a proper horizontal inclination to allow its entrance into and between the two plates of the film frame 70.

The shaft 63 carries the pulley 78, which may be connected to a take-up mechanism for a film.

79 is a revoluble idler.

A film 100 is threaded into the device by passing it over the sprockets 64, 65, a loop formed therein passing it over the idlers 74 and 75 to bring it in alignment with the opening between the film frame 68, passing it through the film frame 68, passing it over the idlers 76 and 77 to bring it in alignment with the opening between the film frame 70, passing it through the film frame 70, passing it over the sprockets 28, 28, passing it over the sprockets 15, 15, passing it over the idler 79 and thence to the take-up box.

When revoluble motion is given the shaft 11, the described intermittent movement moves the film 100 intermittently before the apertures 69 and 71 of the film frames 68 and 70, the shutters 52 and 57 opening and closing said apertures synchronously with the intermittent movement of the film and, at the same time, the idlers 74, 75, 76 and 77 guide the film continuously into alignment with the two film frames, thus allowing the film to be transposed from the plane of one film frame to the plane of the other film frame without pull or distortion.

If the lenses 72 and 73 are camera lenses, a double series of impressions will thus be taken upon a sensitized film, one series of impressions being horizontally abuttable impressions with those upon the other series and in stepped relation to each other, and if the lenses 72 and 73 be projection lenses, with the proper illuminating effect, the photographic impressions taken, as above described, will be projected upon a screen as abutting pictures, thus producing a horizontal wide scope picture of double the visual area of a single lens photograph.

It is evident that a greater number of lenses, than shown in the drawings, may be employed for the production of the series of photographic impressions, or for projecting the same, thus allowing the production and projection of still wider views.

It is also evident that intermittent movements, other than the one shown and described, may be employed for the movement of the film.

I do not limit myself to the particular size, shape, number or arrangement of parts as shown and described, all of which may be varied without going beyond the scope of my invention as shown, described and claimed.

What I claim is:—

1. A motion picture device comprising a plurality of lenses having their optical centers in vertical alignment, the optical axes of the lenses diverging outwardly from each other in such positions that they will cover abutting non-overlapping panoramic views, a stationary film frame for each lens, means whereby a film will be conducted into each film frame in a plane parallel to the plane of the frame and means for intermittently and simultaneously exposing the lenses.

2. A motion picture device comprising a plurality of lenses having their optical centers in vertical alignment, the optical axes of the lenses diverging outwardly from each other in such positions that the optical fields of the lenses will cover a complete extended non-overlapping panoramic horizontal field view, a stationary film frame for each lens, means whereby a film will be conducted into each film frame in a plane parallel to the plane of the frame and means for intermittently and simultaneously exposing the lenses.

3. A motion picture device comprising a plurality of lenses having their optical centers in vertical alignment, the optical axes of the lenses diverging outwardly from each other in such positions that they will cover abutting non-overlapping panoramic views, a stationary film frame for each lens, means whereby a film will be conducted into each film frame in a plane parallel to the plane of the frame and means for intermittently and simultaneously exposing the lenses while the film is at rest.

4. A motion picture device comprising a plurality of lenses having their optical centers in vertical alignment, the optical axes of the lenses diverging outwardly from each other in such positions that the optical fields of the lenses will cover a complete extended non-overlapping panoramic horizontal field view, a stationary film frame for each lens, means whereby a film will be conducted into each film frame in a plane parallel to the plane of the frame and means for intermittently and simultaneously exposing the lenses while the film is at rest.

5. A motion picture device comprising a plurality of lenses having their optical centers in vertical alignment, the optical axes of the lenses diverging outwardly from each other in such positions that the optical fields of the lenses will cover a complete extended non-overlapping panoramic horizontal field view, a stationary film frame for each lens, means whereby a film will be conducted into each film frame in a plane parallel to the plane of the frame and means for intermittently and simultaneously exposing the lenses while the film is at rest whereby a plurality of pictures may be impressed in stepped relationship to each other upon a film within the film frames.

6. A motion picture device comprising a plurality of lenses having their optical centers in vertical alignment, the optical axes of the lenses diverging outwardly from each other, a stationary film frame for each lens, idlers whereby a film will be conducted into each film frame in a plane parallel to the plane of the frame and means for intermittently and simultaneously exposing the lenses.

7. A motion picture device comprising a plurality of lenses having their optical centers in vertical alignment, the optical axes of the lenses diverging outwardly from each other, a stationary film frame for each lens, conical idlers whereby a film will be conducted into each film frame in a plane parallel to the plane of the frame and means for intermittently and simultaneously exposing the lenses.

8. A motion picture device comprising a plurality of lenses having their optical centers in vertical alignment, the optical axes of the lenses diverging outwardly from each other, the optical fields of the lenses covering a complete extended horizontal field view, a stationary film frame for each lens, idlers whereby a film will be conducted into each film frame in a plane parallel to the plane of the frame and means for intermittently and simultaneously exposing the lenses.

9. A motion picture device comprising a plurality of lenses having their optical centers in vertical alignment, the optical axes of the lenses diverging outwardly from each other, the optical fields of the lenses covering a complete extended horizontal field view, a stationary film frame for each lens, idlers whereby a film will be conducted into each film frame in a plane parallel to the plane of the frame and means for intermittently and simultaneously exposing the lenses while the film is at rest whereby a plurality of pictures may be impressed in stepped relationship to each other upon a film within the film frames.

10. A motion picture device comprising a plurality of lenses having their optical centers in vertical alignment with each other, in such positions that the optical fields of the lenses will cover an extended non-overlapping panoramic horizontal field view, a stationary film frame for each lens, means whereby a film will be conducted into each film frame in a plane parallel to the plane of the frame, means whereby a film may be moved a predetermined distance through the film frames, means for protecting the film from light exposure during said movement and means for simultaneously exposing the film through the film frame when the film is at rest.

11. A motion picture device comprising a plurality of lenses having their optical centers in vertical alignment with each other, the optical fields of the lenses covering an extended horizontal field view, a stationary film frame for each lens, idlers whereby a film will be conducted into each film frame in a plane parallel to the plane of the frame, means whereby a film may be moved a predetermined distance through the film frames, means for protecting the film from light exposure during said movement and means for simultaneously exposing the film through the film frame when the film is at rest.

12. A motion picture device comprising a plurality of lenses having their optical centers in vertical alignment with each other, the optical fields of the lenses covering an extended horizontal field view, a stationary film frame for each lens, conical idlers whereby a film will be conducted into each film frame in a plane parallel to the plane of the frame, means whereby a film may be moved a predetermined distance through the film frames, means for protecting the film from light exposure during said movement and means for simultaneously exposing the film through the film frame when the film is at rest.

13. A motion picture device comprising a plurality of lenses having their optical centers in vertical alignment, the optical axes of the lenses diverging outwardly from each other in such position that they will cover abutting non-overlapping panoramic views, a stationary film frame for each lens, a film entering each film frame in a plane parallel to the plane of the frame and means for intermittently and simultaneously exposing the lenses.

14. A motion picture device comprising a plurality of lenses having their optical centers in vertical alignment, the optical axes of the lenses diverging outwardly from each other in such positions that the optical fields of the lenses will cover a complete extended non-overlapping panoramic horizontal field view, a stationary film frame for each lens, means for moving a film through each film frame in a plane parallel to the plane of the frame and means for intermittently and simultaneously exposing the lenses.

15. A motion picture device comprising a plurality of lenses having their optical centers in vertical alignment, the optical axes of the lenses diverging outwardly from each other in such positions that they will cover abutting non-overlapping panoramic views, a stationary film frame for each lens, the film frames being so situated that a film will be conducted into each film frame in a plane parallel to the plane of the frame and means for intermittently and simultaneously exposing the lenses.

16. A motion picture device comprising a plurality of lenses having their optical centers in vertical alignment, the optical axes of the lenses diverging outwardly from each other in such positions that the optical fields of the lenses will cover a complete extended non-overlapping panoramic horizontal field view, a stationary film frame for each lens, the film frames being so situated that a film will be conducted into each film frame in a plane parallel to the plane of the frame and means for intermittently and simultaneously exposing the lenses.

Signed at 233 Broadway, New York city, in the county of New York and State of New York this 6th day of May, 1921.

GEORGE W. BINGHAM.